United States Patent
Bentzinger et al.

(12) 
(10) Patent No.: US 6,807,901 B2
(45) Date of Patent: Oct. 26, 2004

(54) TWO-STAGE SPRING LOADED BALE RAMP

(75) Inventors: Rustin V. Bentzinger, Pella, IA (US); Kent L. Thompson, Otley, IA (US)

(73) Assignee: Vermeer Manufacturing Company, Pella, IA (US)

( * ) Notice: Subject to any disclaimer, the term of this patent is extended or adjusted under 35 U.S.C. 154(b) by 39 days.

(21) Appl. No.: 10/212,558

(22) Filed: Aug. 5, 2002

(65) Prior Publication Data

US 2004/0020376 A1 Feb. 5, 2004

(51) Int. Cl.$^7$ ................................................ B30B 13/00
(52) U.S. Cl. .......................... 100/40; 100/87; 100/88; 100/89; 100/7; 56/341
(58) Field of Search ............................. 100/3, 5, 7, 87, 100/88, 89, 8, 15, 2, 35, 40; 56/341, 344, 345, 346, 350

(56) References Cited

U.S. PATENT DOCUMENTS

| | | | | |
|---|---|---|---|---|
| 3,974,632 A | * | 8/1976 | Van der Lely | |
| 4,206,587 A | * | 6/1980 | Freimuth | |
| 4,406,221 A | * | 9/1983 | Parrish | |
| 4,458,587 A | * | 7/1984 | Jennings | |
| 4,483,247 A | * | 11/1984 | Coeffic | |
| 4,559,770 A | * | 12/1985 | Mast | |
| 4,566,380 A | * | 1/1986 | Clostermeyer | |
| 4,770,093 A | * | 9/1988 | Gunther | |
| 4,779,527 A | * | 10/1988 | Ardueser | |
| 4,798,044 A | * | 1/1989 | Viaud et al. | ................... 56/341 |
| 4,821,637 A | * | 4/1989 | Viaud | |
| 5,822,967 A | * | 10/1998 | Hood et al. | ................... 56/341 |

* cited by examiner

*Primary Examiner*—Allen Ostrager
*Assistant Examiner*—Shelley Self
(74) *Attorney, Agent, or Firm*—Sturm & Fix LLP

(57) ABSTRACT

A method and apparatus for discharging a bale from a baler including a bale ramp that is capable of moving a formed cylindrical bale away from the bale-forming machine. The bale ramp is capable of supporting the formed bale, and utilizing power from a linkage to the bale discharge gate to provide initial horizontal travel of the bale prior to the bale losing significant potential energy. The linkage between the bale discharge gate and the bale ramp includes a lost motion device including a spring that allows energy to be stored from the hydraulic system that powers the bale discharge gate open. That stored energy is applied to the bale, at the appropriate time, as it is able to move. A second stage is provided, which utilizes a traditional spring-loaded ramp. As the bale drops a portion of its potential energy is translated into horizontal momentum and the bale will be caused to move away from the baler.

15 Claims, 11 Drawing Sheets

TWO-STAGE SPRING LOADED BALE RAMP

CROSS-REFERENCE TO RELATED APPLICATIONS

Not Applicable

STATEMENT REGARDING FEDERALLY SPONSORED RESEARCH OR DEVELOPMENT

Not Applicable

BACKGROUND OF THE INVENTION

Field of the Invention

The invention pertains to a machine for forming cylindrical bales of crop materials and more particularly to a mechanism for moving a finished bale a distance away from the machine.

Machines pulled by a tractor for forming cylindrical bales of crop material are well known, including two basic types. A first utilizes side frames, a left side and a right side, and bale-forming belts routed around belt rollers, positioned between the side frames, to define a variable diameter cylinder. The belts work in conjunction with a pickup and feed rollers to pickup crop from a windrow and form it into the cylindrical bale. A second type utilizes side frames and a series of stationary elements, typically rollers or belts supported on rollers, in predetermined positions defining a cylindrical bale-forming chamber. In this case the crop is fed into the bale-forming chamber by a pickup.

The bale-forming chamber is typically a substantial distance from the ground to provide clearance necessary for several reasons. A first reason is related to the need for a substantial structural member, an axle assembly. The weight of the finished bales for these machines is typically substantial, ranging from 500 pounds to up to 3000 pounds, depending on the type of crop material and moisture content. This axle assembly is typically a substantial structural component positioned such that the axle assembly carries the majority of the bale's weight.

A second reason is to provide clearance for the components that directly support the bale, defining the bale-forming chamber, including primarily rollers. These components, attached to the side frames, define the basic structure of the bale-forming machine.

The side frames are typically divided into a front and a rear portion. The rear portions of the side frames are typically pivotally attached to the front portions. The two rear portions, left side and right side, along with the associated rollers, form a bale discharge gate. The discharge gate can be pivoted to an open position to allow a formed bale to drop out of the machine. Once a formed bale is discharged, the discharge gate needs to be closed in order to begin forming the next bale. In order for it to close, the machine needs to be moved away from the discharged bale, or the discharged bale needs to move away from the machine. Moving the machine is undesirable, thus moving the bale is preferred.

Many mechanisms have been developed to assist in moving the bale away from the machine as it is discharged. One form is known as a bale ramp which includes a ramp that functions to convert a portion of the bale's vertical momentum, from dropping out of the bale forming chamber, into horizontal momentum. The result is that the bale may roll away from the machine. Many types of spring assists and other types of apparatus have been developed to improve the effectiveness of bale ramps. This type of mechanism is cost effective. However, function is dependent on the ground conditions and ability of a bale to roll, and thus the performance will vary and can be limited.

Another type includes a bale push bar that is attached to the machine and is capable of pushing the bale. These mechanisms are known in a variety of forms and have been powered by separate hydraulic systems, or alternatively from connections to the bale discharge gate, as disclosed in U.S. Pat. No. 4,779,527. The bale push bars offer the most reliable performance, however are also the most costly to produce.

The need for a cost-effective component that is capable of consistently moving a bale away from a baling machine still exists.

SUMMARY OF THE INVENTION

According to the present invention a bale ramp that is capable of moving a formed cylindrical bale away from the bale-forming machine. The bale ramp is capable of supporting the formed bale, and utilizing power from a linkage to the bale discharge gate to provide initial horizontal travel of the bale prior to the bale losing significant potential energy.

According to another aspect the linkage between the bale discharge gate and the bale ramp includes a lost motion device including a spring that allows energy to be stored from the hydraulic system that powers the bale discharge gate open. That stored energy is applied to the bale, at the appropriate time, as it is able to move.

According to another aspect there is provided a second stage, which utilizes a traditional spring-loaded ramp. As the bale drops a portion of its potential energy is translated into horizontal momentum and the bale will move away from the bale-forming machine.

DESCRIPTION OF THE PREFERRED EMBODIMENT

Figure 1:
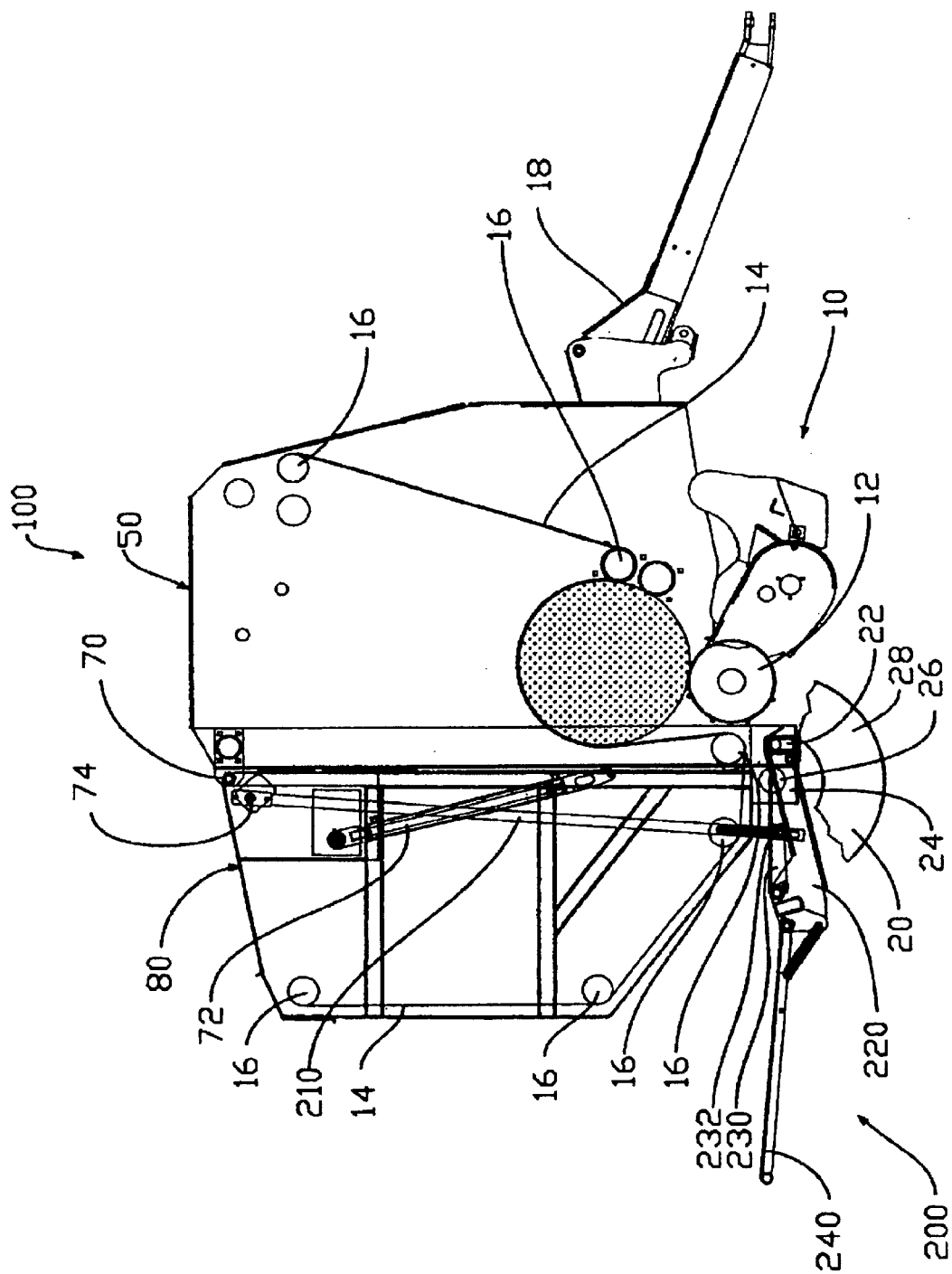
FIG. 1 is an outline of the right side of a conventional variable chamber round baler showing locations of the side frames, the axle, bale-forming belts, some of the belt rollers, a partially formed round bale in the front section of the baler, the bale discharge gate in its closed position, and the bale ramp of the present invention in its normal condition.

With reference now to the various figures in which identical elements are numbered identically throughout, a description of various exemplary aspects of the present invention will now be provided. The preferred embodiments are shown in the drawings and described with the understanding that the present disclosure is to be considered an exemplification of the invention and is not intended to limit the invention to the embodiments disclosed.

FIG. 1 is an outline from the right side of a round baler 100 constructed to form cylindrical bales of crop material. It is illustrated as a single side view. One skilled in the art will recognize the fact that there are two opposing sides, left and right, spaced apart a distance equal to the length of the cylindrical bale.

The crop material enters the round baler at the pickup 10 where it is lifted and positioned in contact with a drum roller 12 that supports the forming bale at the bottom. The crop material is formed into the cylindrical shape by the cooperative action of the drum roller 12, and the bale forming belts 14.

The pickup 10, and drum roller 12 are supported in the front portion of the baler frame 50. This front portion 50 also includes belt rollers 16, over which the bale-forming belts 14 travel, draft tongue 18 and axle assembly 20.

Axle assembly 20 includes a cross tube 22 and end plates 24 that form the main structure of the axle assembly 20. The end plates allow a hub and spindle assembly 26, onto which the wheel assembly 28 mounts, to be positioned independent of the position of the cross tube 22. This allows flexibility to locate the cross tube 22 furthest forward, to enhance the ability to eject a bale, while positioning the wheel assembly 28 to most appropriately balance the machine in all its operational configurations.

The round baler 100 also includes a rear portion, the bale discharge gate 80. This discharge gate 80 includes belt rollers 16 which guide the bale forming belts 14. It is pivotally connected to the front section 50 at bale discharge gate pivot 70. Discharge gate lift cylinders 72 are provided to propel the discharge gate 80 from a closed position to an open position, gravity typically propels the discharge gate 80 from the open position to the closed position; in FIG. 1 it is shown in the closed position.

As described thus far the round baler is conventional.

The bale ramp 200 of the present invention is also illustrated in FIG. 1. It includes an activation link 210, a frame 220, a first ramp section 230, and a second ramp section 240. The frame 220 pivotally supports both ramp sections. The activation link 210 is pivotally attached at the top to the discharge gate 80 at bracket 74 and is also pivotally connected to the first ramp section 230 at a pivot pin 232. The frame 220 is attached to the cross tube 22 of the axle assembly 20.

Figure 2:
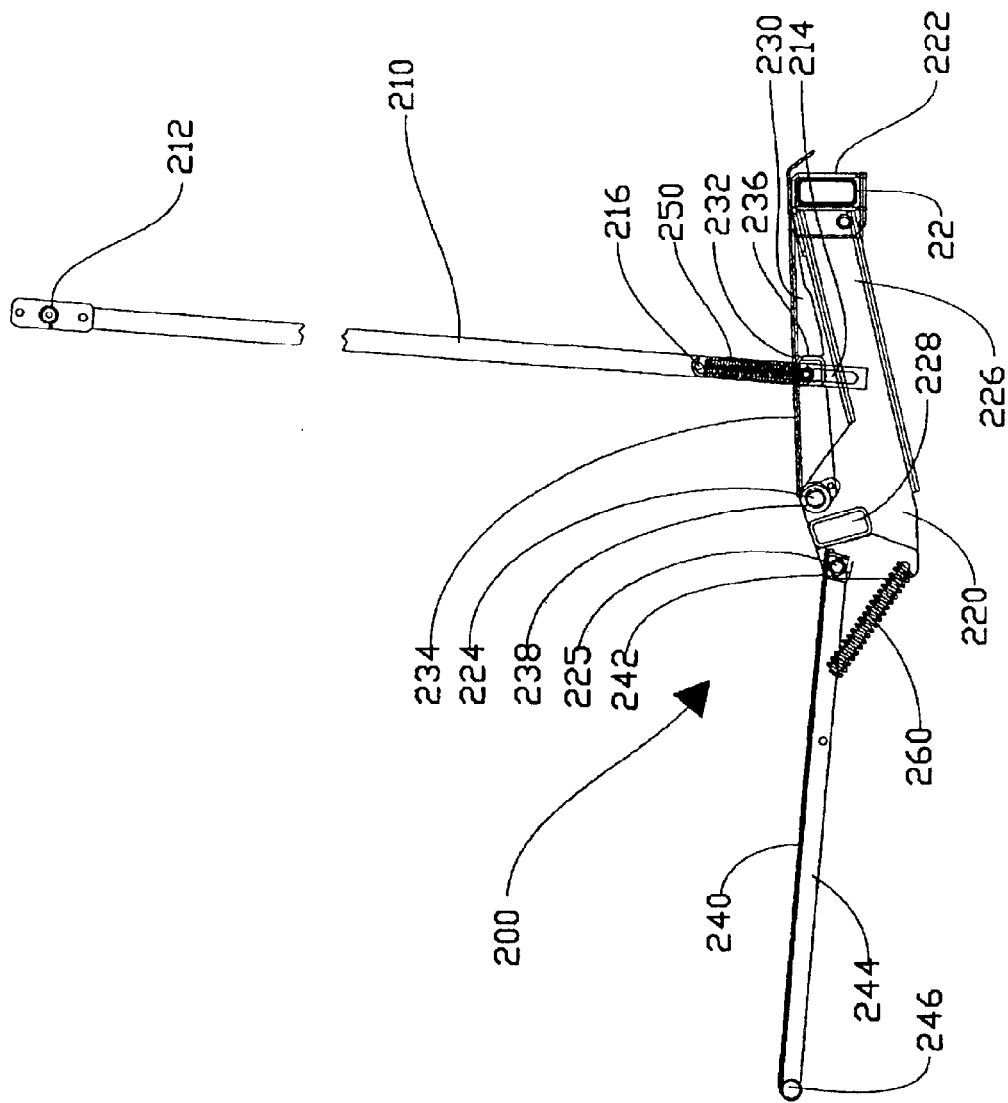
FIG. 2 is a view from the right side of the bale ramp assembly of the present invention in its normal condition.

FIG. 2 illustrates the bale ramp 200 in more detail. The ramp is illustrated in this single side view. One skilled in the art will recognize that there are two opposing sides, so that the ramp has a width sufficient to provide support to the bale. The width is not important to the aspects here-in described, and may be adjusted to match the length of the cylindrical bale. Frame 220 includes a pair of front adapters 222 which are configured to attach to the axle cross-tube 22 of the axle assembly 20. Only one is illustrated in the side view. This adapter can be configured to adapt to any variation of cross-tube utilized for the axle. It further includes a pair of side arms 226, each one attached to a front adapter 222. The side arms 226 are attached, at the opposite end, to a cross-tube 228 that, as properly installed, is generally parallel to the axle cross-tube 22. Cross tube 228 defines the width of the Frame 220. The frame 220 is sufficiently rigid to support the full weight of a formed bale setting on the cross-tube 228.

Frame 220 further defines a pivot axis 224 for first ramp section 230. It also provides a pivot axis 225 for second ramp section 240.

First ramp section 230 is pivotally attached to frame 220 at pivot axis 224. It further includes a pair of pivot pins 232 attached to a cross-tube 236, a bale support frame 234, and a pivot tube 238. Bale support frame 234 attaches to pivot tube 238 at its reward end, and is adapted to rest against the front adapter 222 or axle cross-tube 22 at the front end. The cross-tube 236 is attached to the bale support frame 234 near the center and is of sufficient length to position the pivot pins 232 outside the width of the baler's discharge gate 80, and in alignment with the activation link brackets 74. This provides for convenient connection to the activation link 210, the activation link 210 being substantially vertical, as illustrated in FIG. 1.

The activation link 210 is a strap that includes a pivot feature 212 at its top end that is adapted to cooperate with the activation link bracket 74. In the preferred embodiment, this pivot feature 212 is a through hole sized to accept a shaft that is a part of the activation link bracket 74. Some form of retainer is employed to hold the activation link 210 engaged with the activation link bracket 74.

The opposite, bottom, end of the activation link 210 includes slot 214 with a top end that is closest to the top and a bottom end that is closest to the bottom. Slot 214 is sized to accept pin 232. A type of retainer (not shown) is employed to hold activation link 210 in engagement with pin 232 such that the activation link 210 can move through the range of travel defined by the length of slot 214 without moving the first ramp section 230. This linkage between the activation link 210 and the first ramp section 230 is a lost-motion linkage.

The lost-motion linkage is constrained by a pair of tension springs 250 such that the pin 232 is held against the top of slot 214, when there is no significant load carried by the first ramp section. This results from installation of the springs 250, one on each side, attached to a spring pin 216 which is fixedly attached to activation link 210. The opposite end of each spring 250 is attached to a pin 232. In this position each of the springs will be slightly preloaded such that each pin 232 is forced against the top of slot 214. Thus, the position of the top of slot 214 and the position of pivot 224, defined by the frame 220, determines the position of the first ramp section 230 in an unloaded condition.

In addition to providing support for the first ramp section 230, frame 220 also supports the second ramp section 240. The two side arms 226 define a pivot axis 225. Second ramp section 240 includes a pair of ramp arms 244, each pivoting at pivot axis 225 on pivot tubes 242. The ramp arms 244 are spaced a distance apart, approximately equal to the spacing of the side arms 226. In the preferred embodiment the side arms 244 are connected by an end tube 246.

The second ramp section 240 is held in position by a pair of compression springs 260, each acting between a ramp side arm 244 and a frame side arm 226. In its non loaded condition the springs 260 are located to hold the second ramp section 240 in the position as illustrated in FIG. 1, holding it off the ground and raised to avoid inadvertent contact with the ground.

Figure 3:
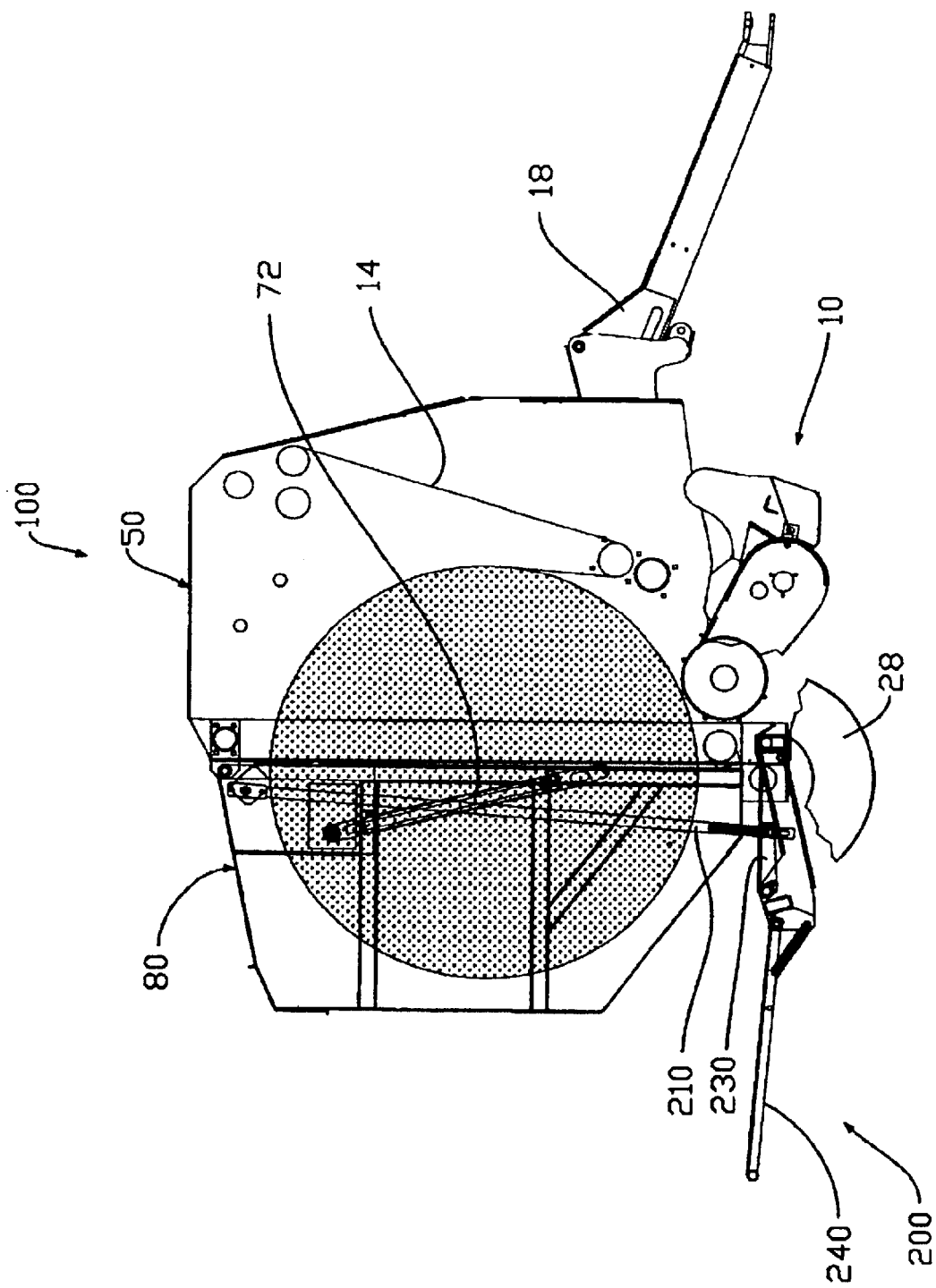
FIG. 3 is a view similar to FIG. 1 except showing the location of a formed round bale in the bale-forming chamber.
Figure 4:
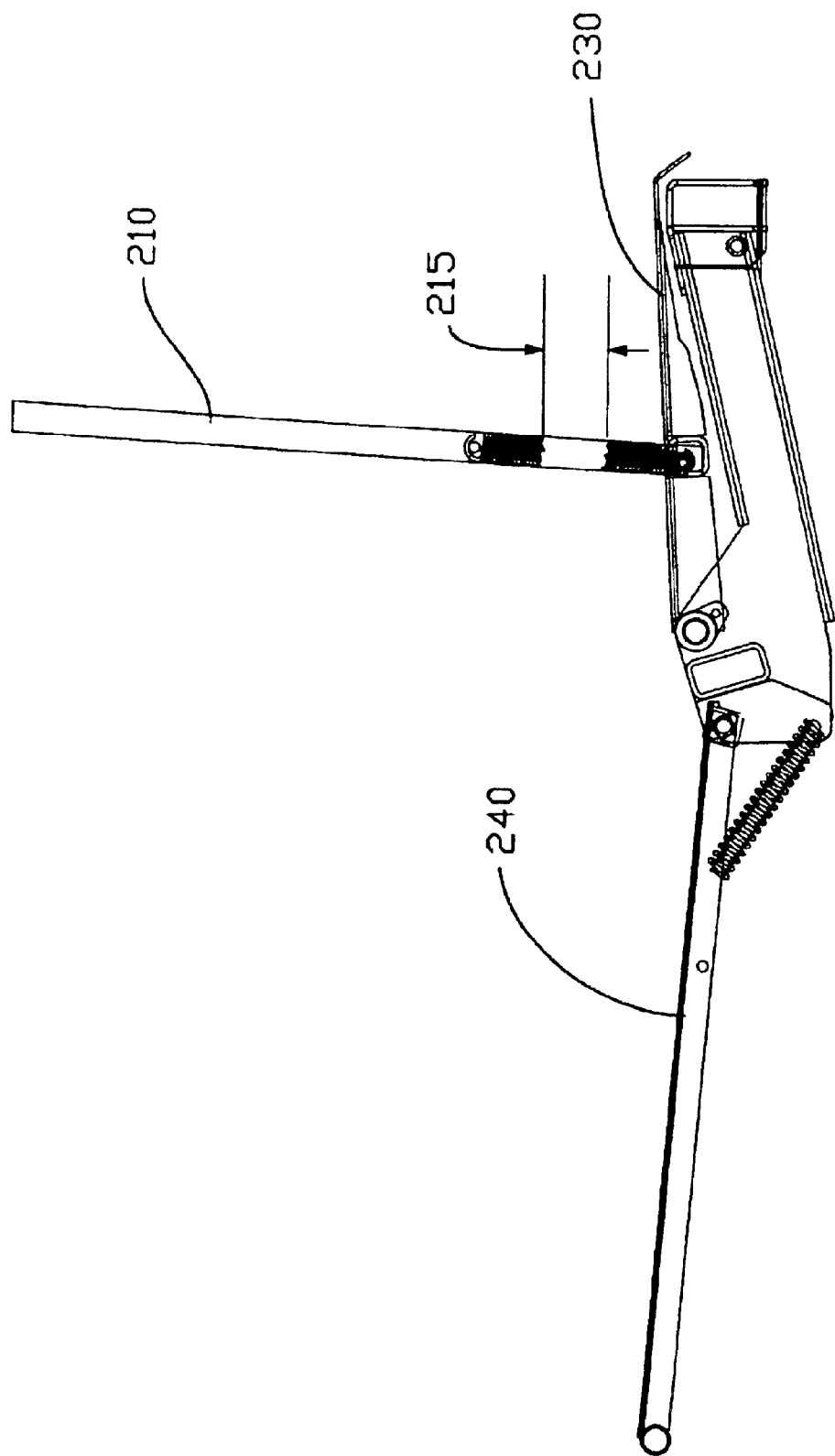
FIG. 4 is a view from the right side of the bale ramp assembly of the present invention in its condition wherein the free motion linkage has preloaded the spring.
Figure 5:
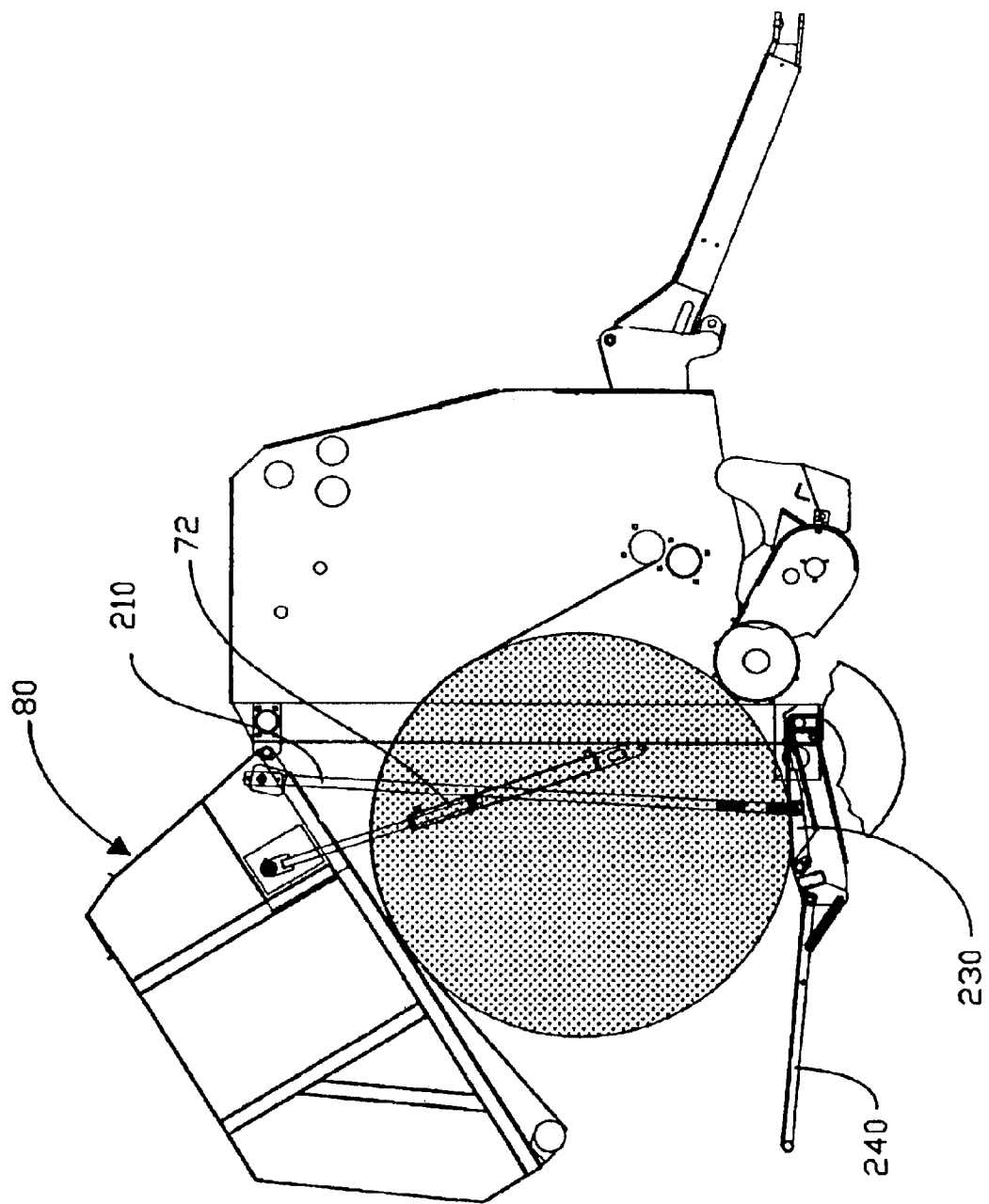
FIG. 5 is a view similar to FIG. 1 except showing the location of a formed round bale as it begins to exit the bale-forming chamber, the bale discharge gate in a partially open position, and the bale ramp of the present invention the condition illustrated in FIG. 4.

The function of the ramp is illustrated in FIGS. 3–11. FIG. 3 illustrates the bale forming machine 100 holding a formed bale, with the discharge gate 80 closed and in condition to begin bale discharge. The first step of discharging a bale is to begin extending lift cylinders 72 to raise the discharge gate 80, as illustrated in FIG. 5. This initial motion will allow the formed bale to begin moving out of the bale forming chamber, where it will be supported by the first ramp section 230. Movement of the bale discharge gate 80 will also cause the activation link 210 to be raised.

FIG. 4 illustrates the resulting condition of the ramp 200. The formed bale is resting on the first ramp section 230 such that it cannot move upwards. Activation link 210 has been raised until the pivot pin 232 has contacted to bottom of slot 214 (FIG. 2). This motion has resulted in stretching spring 250 an additional amount equal to the length of the slot, distance 215 (FIG. 4).

Figure 6:
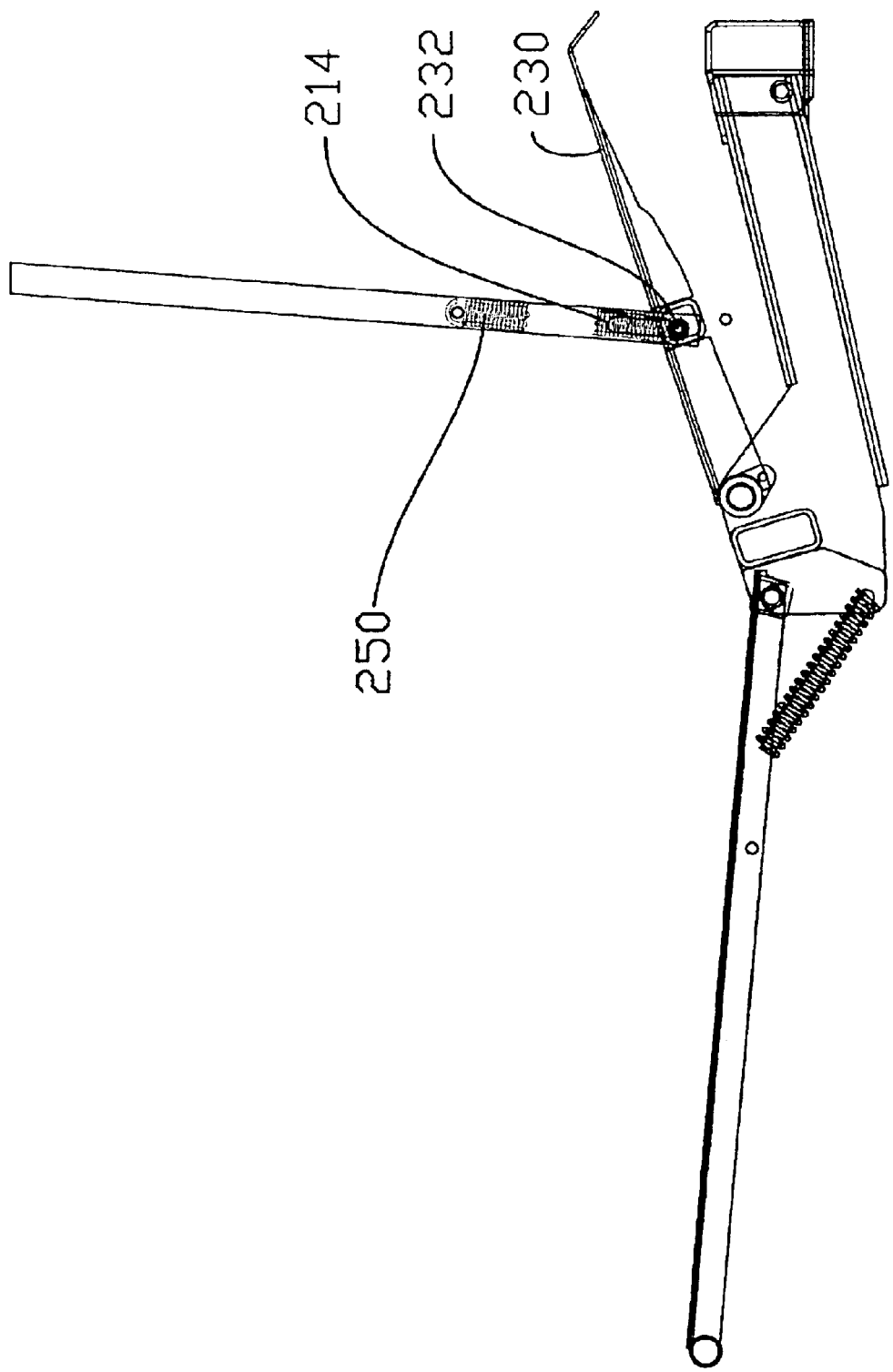
FIG. 6 is a view from the right side of the bale ramp assembly of the present invention in its condition wherein the free motion linkage has preloaded the spring, and has raised the first section of the ramp.
Figure 7:
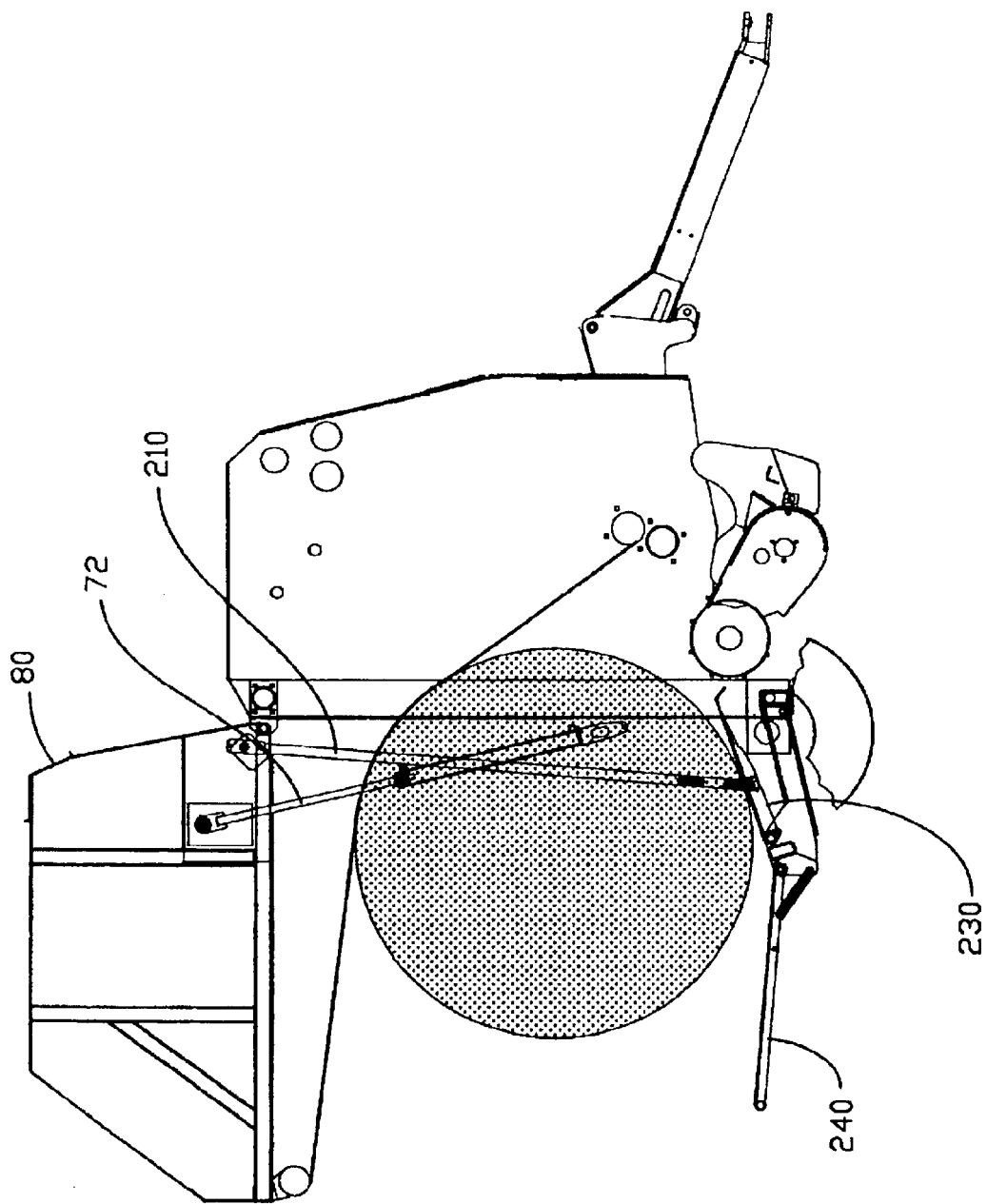
FIG. 7 is a view similar to FIG. 1 except showing the location of a formed round bale as it begins to exit the bale-forming chamber, the bale discharge gate in a fully open position, and the bale ramp of the present invention the condition illustrated in FIG. 6.

The lift cylinders 72 will continue raising the discharge gate 80 to its fully open position as illustrated in FIG. 7. This will result in additional travel of the activation link 210 causing the first ramp section 230 to pivot into a second position as illustrated in FIGS. 6 and 7. In this position, the pivot pins 232 are still in contact with the bottom of slots 214, and spring 250 is still stretched. First ramp section 230 is pivoted into a raised position sufficient to force the formed bale to slide or roll backwards. As the bale begins to slide or roll, the energy stored in springs 250 will be used to raise the first ramp section 230 and to accelerate the formed-bale.

Figure 8:
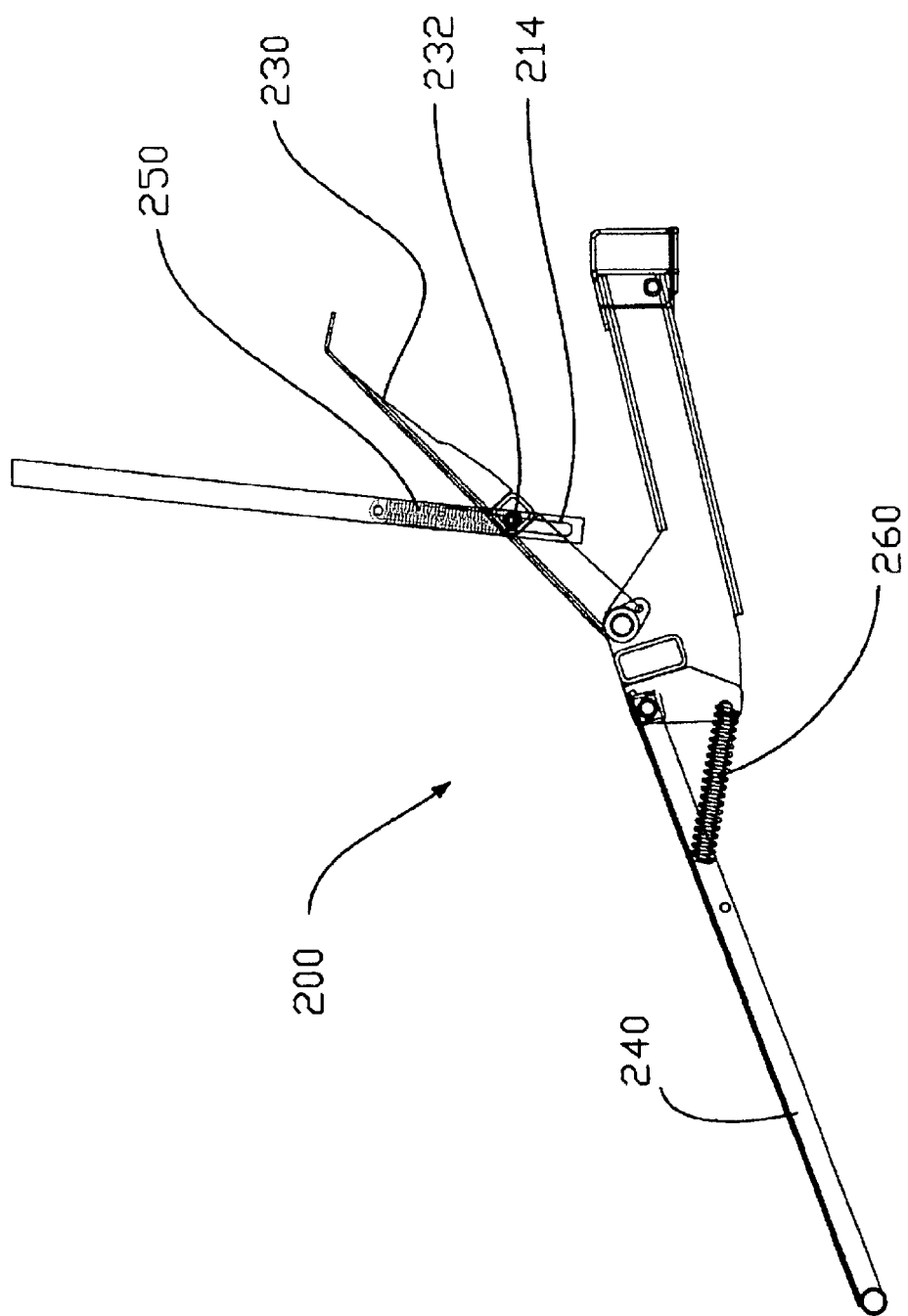
FIG. 8 is a view from the right side of the bale ramp assembly of the present invention in its condition wherein the spring has fully raised the first section of the ramp and the bale's weight has compressed the spring of the second section of the ramp.
Figure 9:
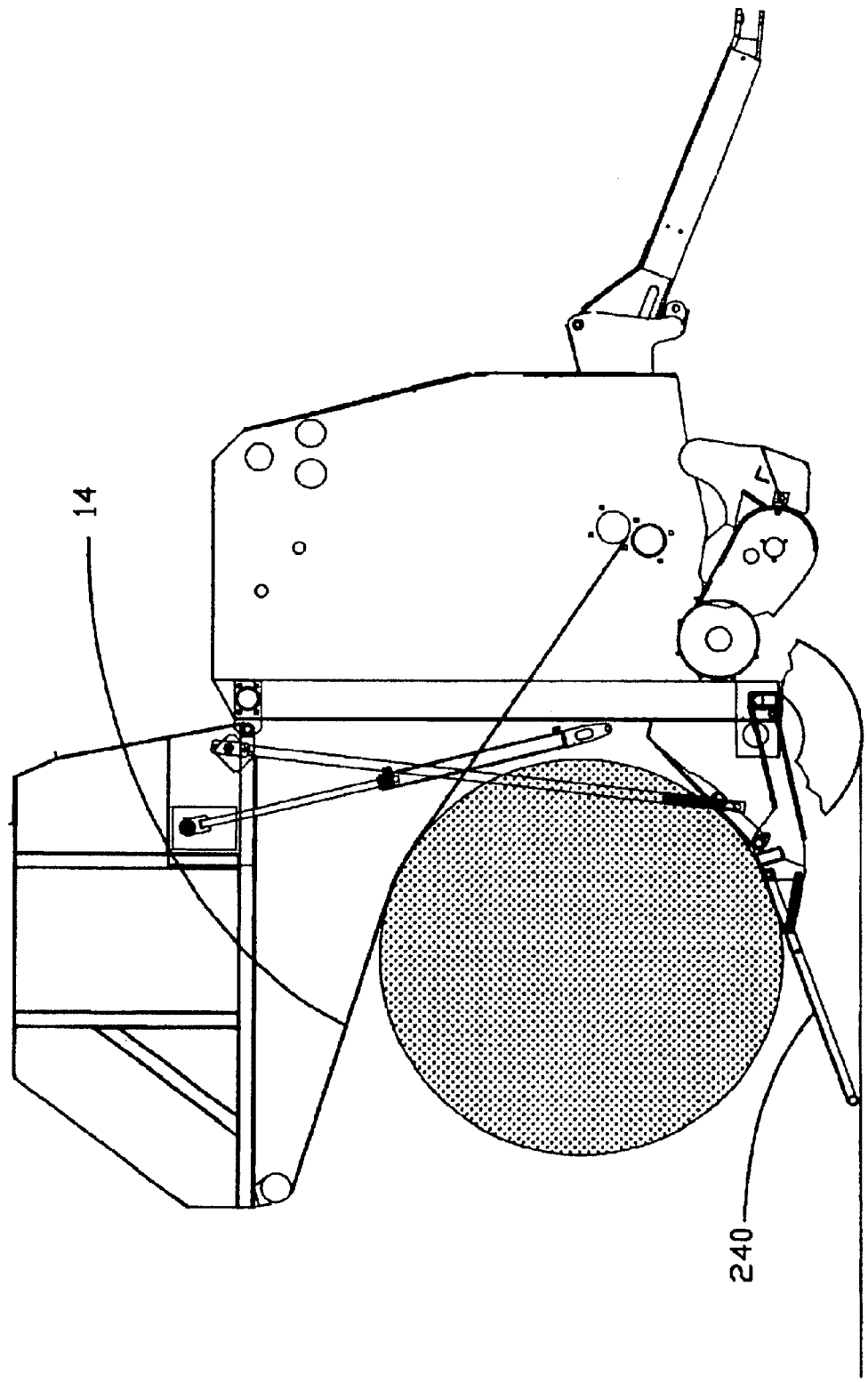
FIG. 9 is a view similar to FIG. 1 except showing the location of a formed round bale as it begins to exit the bale-forming chamber, the bale discharge gate in a fully open position, and the bale ramp of the present invention the condition illustrated in FIG. 8.

FIGS. 8 and 9 illustrate the position of the bale and the condition of the bale ramp 200 in this next position. Springs 250 have retracted and pivot pins 232 are again contacting the top of slots 214. The first ramp section 230 is in its highest position. The bale has thus begun to travel out of the baler 100 and contacted second ramp section 240 and forcing it to pivot down until contacting the ground and compressing springs 260. At this point the top of the formed-bale may still be slightly in contact with the bale-forming belts 14. This contact was more significant in the earlier positions of the bale, and may have restricted its ability to roll. However, from the position of bale as shown in FIG. 9 and as it continues to move down the second ramp section 240, it will be freed from this contact and will begin to roll. As it rolls down second ramp section 240 it will gain speed and thus will continue to roll beyond the end of second ramp section 240. As it continues to roll along the ground, the springs 260 will lift second ramp section 240 into contact with the bale tending to continue propelling it along the ground.

Figure 10:
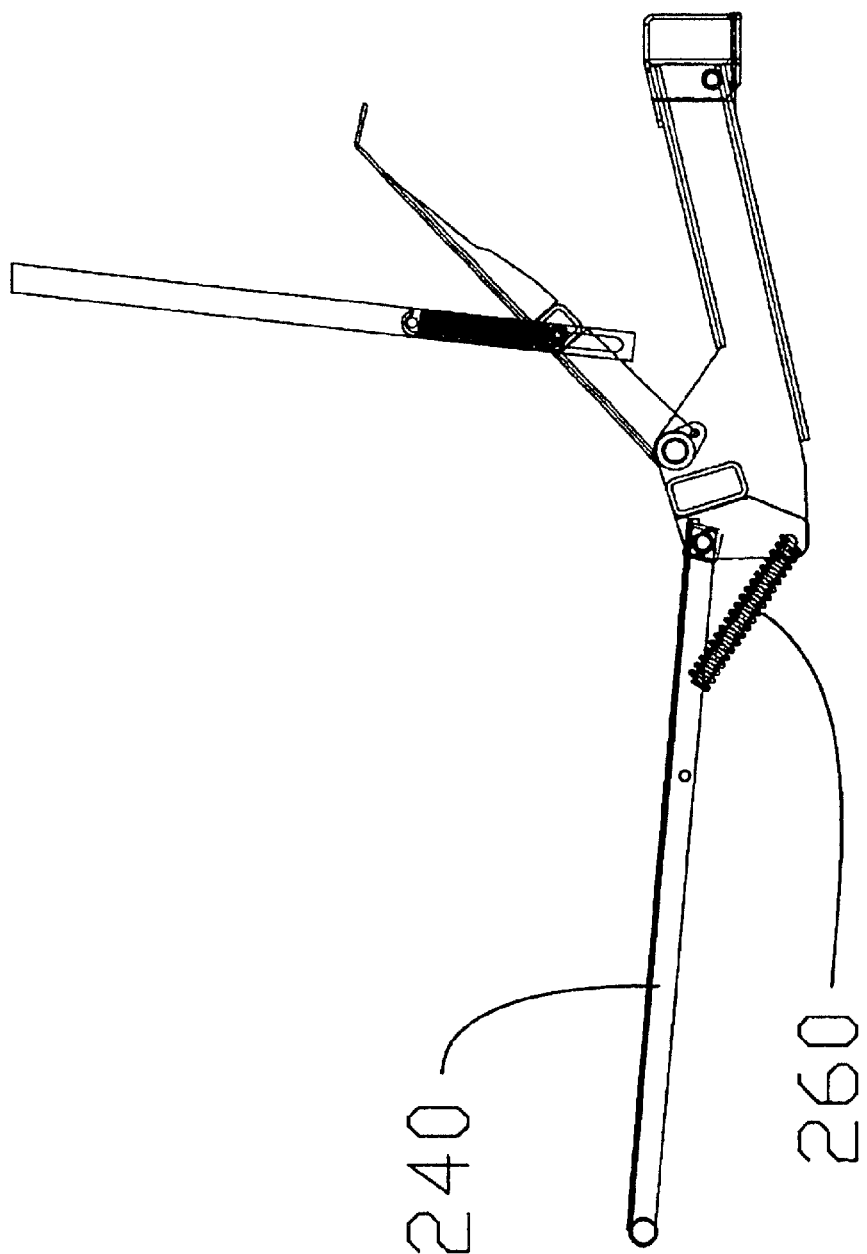
FIG. 10 is a view from the right side of the bale ramp assembly of the present invention in its condition wherein the first section of the ramp is fully raised and the second section is also raised.
Figure 11:
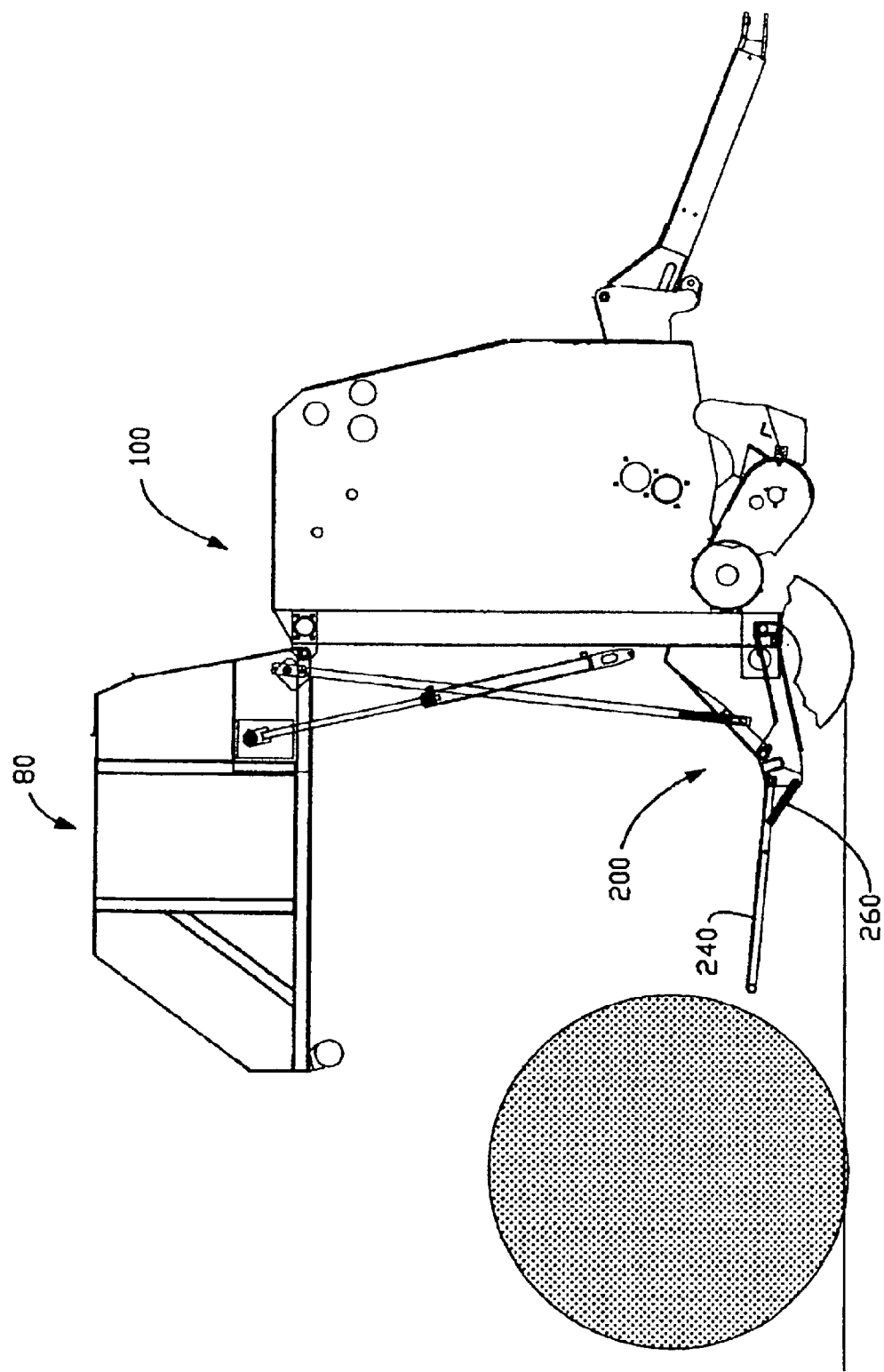
FIG. 11 is a view similar to FIG. 1 except showing the location of a formed round bale after it has exited the baling machine and been propelled backwards by the ramp, the bale discharge gate in a fully open position, and the bale ramp of the present invention the condition illustrated in FIG. 10.

FIGS. 10 and 11 illustrate the position of the bale, baling machine 100 and ramp 200 after the formed-bale has exited. The second ramp section 240 has been raised by springs 260 and the bale has been propelled away from the baling machine 100. It is now possible to close the discharge gate 80 without interfering with the formed-bale, back into the position illustrated in FIG. 1.

The embodiments of the present disclosure may be used in a variety of applications. For example, the two-stage bale ramp as detailed in the preferred embodiment is adapted to variable chamber baler, however it could likewise be adapted to a fixed chamber baler. In addition, it is obvious that many other modifications and variations of the present invention are possible in light of the above teachings. It is therefore to be understood that, within the scope of the appended claims, the invention may be practiced otherwise than as specifically described.

We claim:

1. In a baler for forming substantially cylindrical bales of crop including a front portion, with an axle, that supports a rear portion, extensible and retractable actuator connected between the front and rear portions for selectively opening and closing said rear portion, and a bale discharge apparatus for moving a formed cylindrical bale away from the baler as the rear portion is moved from a closed to an open position the bale discharge apparatus comprising:

a frame adapted to mount to said baler;

a first ramp section pivotally attached to said frame;

a second ramp section pivotally attached to said frame; and a linkage connected to said first ramp section and to said rear portion, said linkage causing the first ramp section to move from a first position to a raised second position when said rear portion is moved from the closed position towards the open position.

2. The bale discharge apparatus as in claim 1 where the linkage is a lost motion linkage wherein the rear portion can be moved independent from the first ramp section.

3. The bale discharge apparatus as in claim 2 wherein the lost motion linkage further includes a spring.

4. The bale discharge apparatus of claim 1 wherein said frame is adapted to mount to said axle.

5. The bale discharge apparatus of claim 4 wherein biasing member is operatively attached to said second ramp section and to said baler to move the second ramp section from the lower to the upper position after the bale is discharged onto the ground for causing the push on the bale and for maintaining the second ramp section in the raised position except during a bale discharging operation.

6. The bale discharge apparatus of claim 5 wherein said biasing member is a compression spring.

7. In a baler for forming substantially cylindrical bales of crop including a front portion, with an axle, that supports a rear portion, an extensible and retractable actuator connected between the front and rear portions for selectively opening and closing said rear portion, and a bale discharge apparatus for moving a formed cylindrical bale away from the baler as the rear portion is moved from a closed to an open position the bale discharge apparatus comprising:

a frame adapted to mount to said baler;

at least one ramp section pivotally attached to said frame; and a linkage connected to said first ramp section and to said rear portion, said linkage causing the first ramp section to move from a first position to a raised second position when said rear portion is moved from the closed position towards the open position.

8. The bale discharge apparatus as in claim 7 wherein the linkage is a lost motion linkage wherein the rear portion can be moved independently from the first ramp section.

9. The bale discharge apparatus as in claim 8 wherein the lost motion linkage further includes a spring.

10. The bale discharge apparatus of claim 7 wherein said frame is adapted to mount to said axle.

11. The bale discharge apparatus of claim 7 further including a second ramp section pivotally attached to said frame.

12. A method of discharging a formed cylindrical bale of crop from a baler comprising the steps:

first movement of a rear portion of said baler from a closed to a partially open position, said first movement simultaneously causing movement of a lost-motion linkage which is operatively attached to a first ramp section and allowing said formed bale to move from a bale formation chamber of said baler to an intermediate position where said bale is supported by said first ramp section in a first position wherein the lost-motion linkage includes an energy storage element that holds potential energy, due to the movement of the lost-motion linkage, tending to encourage said first ramp section to move from said first position to a second raised position;

second movement of said rear portion of said baler from the partially open position to a fully open position simultaneously causing further movement of said lost-motion linkage and releasing said formed bale, wherein the further movement of said lost-motion linkage causes said first ramp section to move from said first position to a second position which causes said formed bale to rise and begin to roll; and final movement of said first ramp section from said second position to a final raised position which results from said energy storage element transferring said potential energy to raise said first ramp section and to provide additional kinetic energy of velocity of said formed bale as it rolls along the first ramp section.

13. The method of discharging a formed cylindrical bale of crop from a baler of claim 12 further comprising the steps:

said bale supported by a second ramp section as it leaves said first ramp section wherein the weight of the bale acts to rotate said second ramp section from a first raised position to a second lowered position which rotation transfers a portion of said bale's kinetic energy and potential energy to a second energy storage element as the bale is lowered into contact with the ground; and said second ramp section acts on said bale, as it rolls along the ground, by moving from said second lowered position to said first raised position allowing the energy storage element to transfer a portion of said potential energy into kinetic energy to urge said bale along the ground.

14. The bale discharge apparatus as in claim 1 wherein the first ramp extends across the baler, from one side to the other side of the baler, behind the axle and under the rear portion for supporting the bale as the bale is being discharged.

15. The method of discharging a formed cylindrical bale of crop from a baler of claim 12 wherein the steps further include use of a first ramp which extends across the baler, from one side to the other side of the baler, behind the axle and under the rear portion for supporting the bale as the bale is being discharged.

* * * * *